4 Sheets—Sheet 1.
R. GEORGE.
MACHINE FOR CONCENTRATING AND SEPARATING ORES AND MINERALS.
No. 89,476. Patented Apr. 27, 1869.
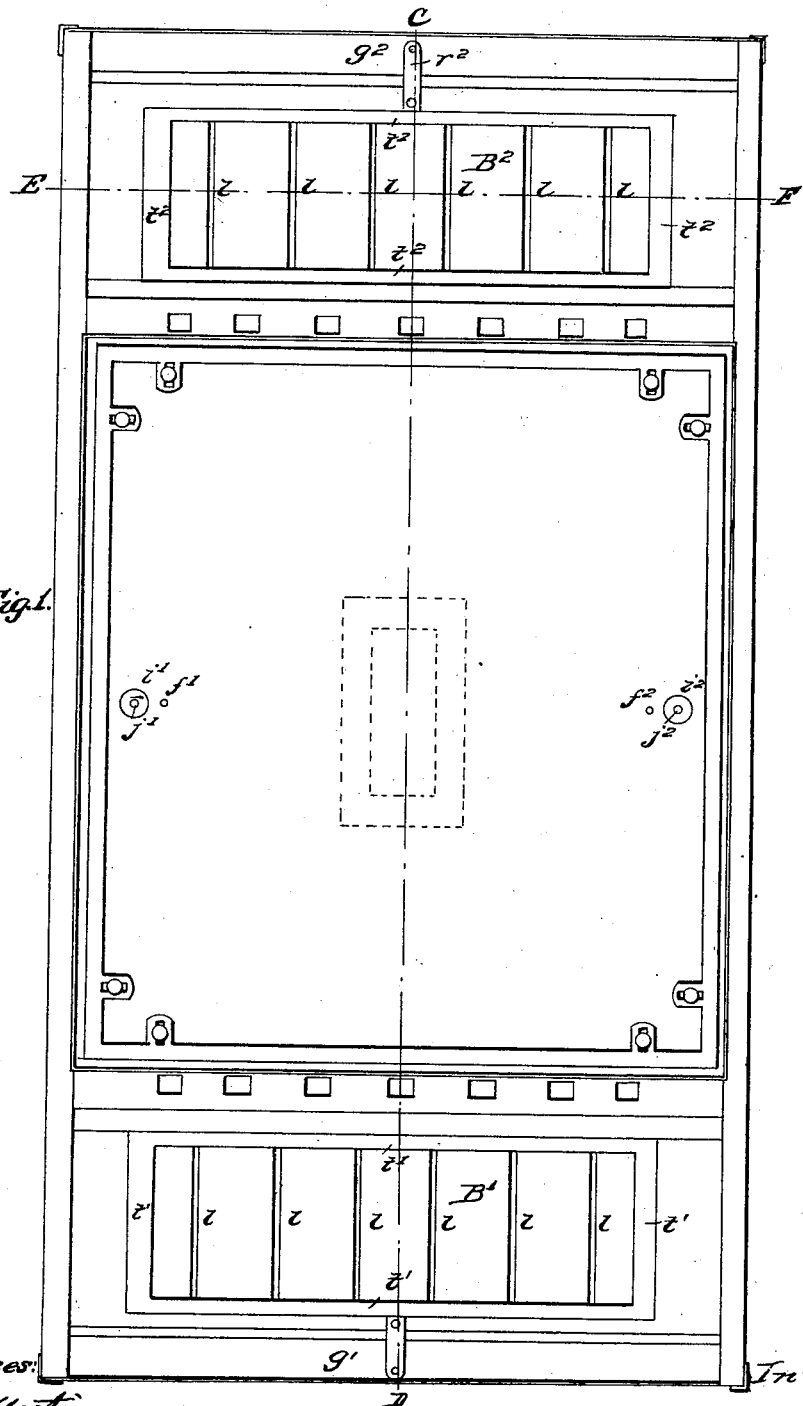

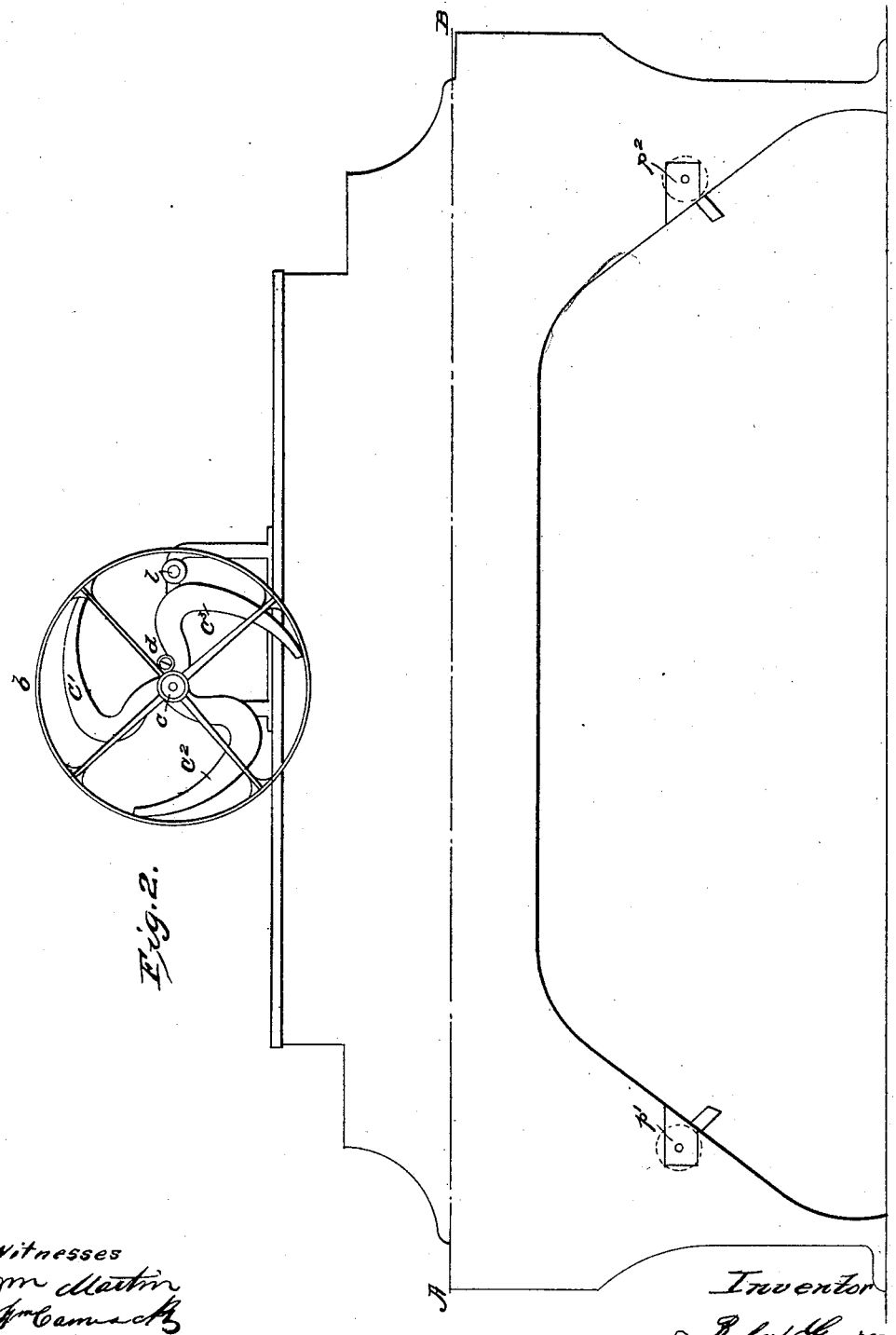

4 Sheets—Sheet 3.
R. GEORGE.
MACHINE FOR CONCENTRATING AND SEPARATING ORES AND MINERALS
No. 89,476. Patented Apr. 27, 1869.
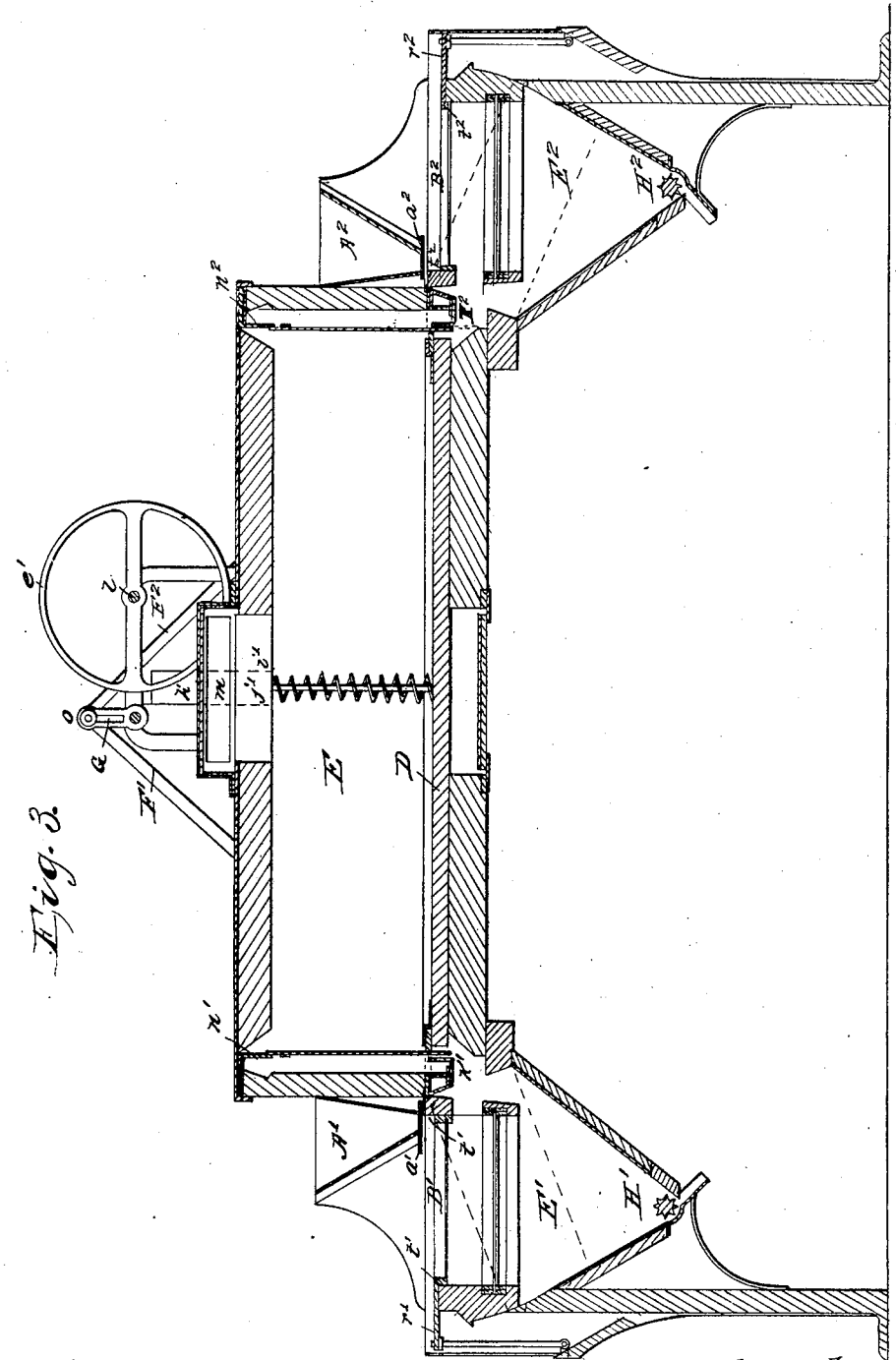
Witnesses:
Wm Martin
N. Cammack
Inventor
Robert George

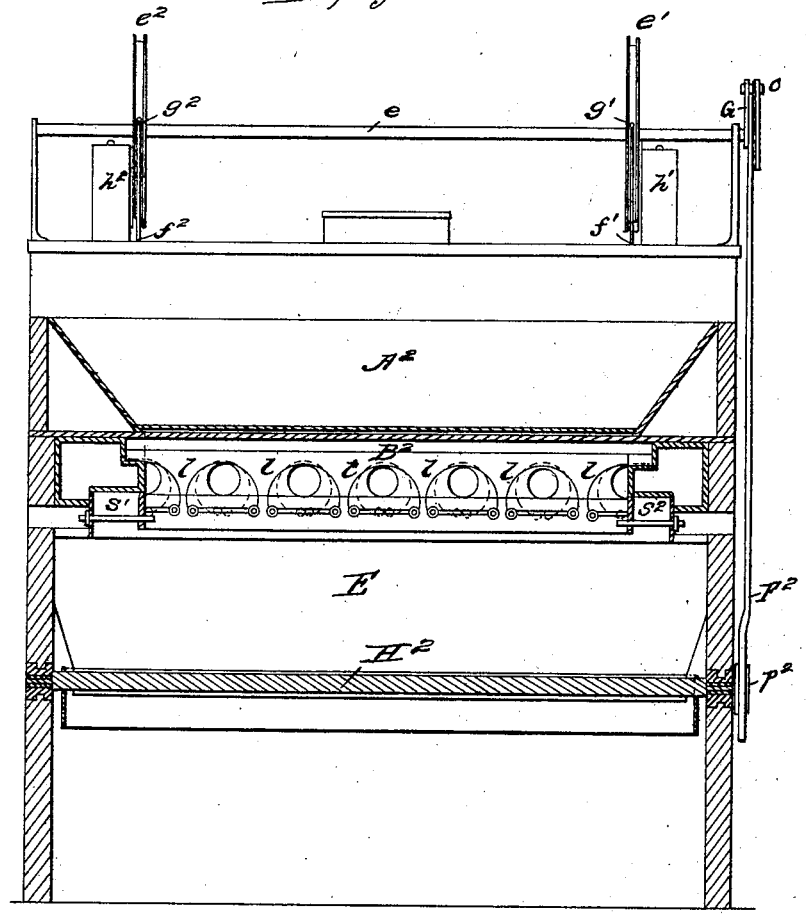

ROBERT GEORGE, OF DENVER CITY, COLORADO TERRITORY.

Letters Patent No. 89,476, dated April 27, 1869

IMPROVED MACHINE FOR CONCENTRATING AND SEPARATING ORES AND MINERALS.

The Schedule referred to in these Letters Patent and making part of the same.

*To all whom it may concern:*

Be it known that I, ROBERT GEORGE, of Denver City, in the county of Arapahoe, and Territory of Colorado have invented a new and useful Machine for Concentrating and Separating Metals and Mineral Substances from rocks, alluvials, and metallurgical and other products contained in an admixture, or in a natural, or chemical combination; and I do hereby declare that the following is a full, clear, and exact description of the construction and operation of the same, reference being had to the annexed drawings, making a part of this specification, in which—

Figure 1, Sheet I, is a plan view, on the line A B.
Figure 2, Sheet II, is a side elevation.
Figure 3, Sheet III, is a transverse section through line C D.
Figure 4, Sheet IV, is a front view on the sectional line E F.

The sectional lines are indicated by red lines and red-colored capital letters.

The different materials are denoted as follows:
Wood-materials, yellow.
Iron, blue.
Brass, greenish yellow.
Leather, brown.

Similar letters in black ink refer to similar parts throughout the several elevations and sections.

My machine is designed to concentrate and separate the precious metals, especially in such regions where the separation of the same by water can only be accomplished by great cost, or not at all, as is, for instance, the case in the dry placers of Colorado, New Mexico, Arizona, &c.

My object is, further, to save gold, silver, copper, and any valuable metals which are wasted during their treatment in stamp-mills, either by imperfect amalgamation, or where the nature of the minerals which associate or contain the precious metals renders the saving of the same by the old processes impossible. I intend, further, to accomplish the saving of such minute particles of gold, silver, and platinum, which are carried off by the current of water, which is especially the case when the water used for their separation is not pure; and mixed with earthy substances; because it is a fact that the precious metals, in a finely divided state, will condense gases likewise, as platinum-sponge does, to form an atmosphere of such condensed gases around themselves, which causes them to float on water, as is also the case with quicksilver, when in minute particles, whether amalgamated or not, whereby a great loss of the precious metals takes place, when treated in such water.

Furthermore, a great deal of the richest silver and gold-ore is impregnated in the cavities of the associated minerals in a pulverized state of ochre, which cannot be saved by the application of water in the process of dressing or concentrating such ore. A similar difficulty is the case when minerals are to be separated from each other where the difference of their respective specific gravity is only insignificant, as, for instance, by galena and sulphuret of zinc, by iron and copper pyrites. By the hitherto known process of separating such minerals, is always a great loss combined with their concentration, while their separation by technical means remains imperfect and impracticable.

Various machines have been constructed to overcome the above-mentioned difficulties and imperfectness, but they have generally failed to answer in a practical manner, either doing the work insufficiently, or doing too small amount of work in a certain time, or being of no general character for application, answering only to a certain species of minerals, or, when in peculiar circumstances, requiring the utmost equality and minuteness of grain and fracture of the substances to be treated, all circumstances which are practically very difficult to comply with.

I have, therefore, endeavored, with great care, and by manifold expensive experiments, to construct a machine on such principles, and in such a way, that a general application of the same is possible, and the concentration and separation of the precious and other valuable metals are accomplished in great quantities, in shorter time, and by very limited cost, in regard to the price of the machine itself, for the practical working of the same.

The successful result of the working of my machine is accomplished by a variated action of air under and among the particles of the materials to be separated, by accompanied action of concussion, and by simultaneous and continuous carrying off the waste matters and separated valuable substances.

To produce the largest amount of work in regard to quantity and quality, my machine is constructed as double acting in every respect, with the utmost economy of its motive power, and steadiness and durability in the practical use of the same.

The machine consists of the hoppers $A^1$ and $A^2$, into which the materials to be treated are charged. The outlet of the same is regulated by the drawers $a^1$ and $a^2$. From these drawers the materials pass on the sieves $B^1$ and $B^2$, covering all their segments to a desirable thickness. The machine is set in motion by a crank or pulley, $b$, fastened on the revolving shaft $c$, with the lifters $C^1$, $C^2$, and $C^3$, which are raising the truck $d$ on the shaft $e$, with the lever-wheels $e^1$ and $e^2$ to the desired distance.

On the lifter-wheels $e^1$ and $e^2$ are cords $f^1$ and $f^2$, fastened by the regulating-screws $g^1$ and $g^2$.

On these cords is the piston D, in the blast-chamber E, attached so when the truck $d$ is raised by lifter $C^1$, or $C^2$, or $C^3$, the same must follow in an upward direction.

To the piston D and the spring tubes $h^1$ and $h^2$ are springs $i^1$ and $i^2$, connected, which are guided on the rods $j^1$ and $j^2$.

As soon as the truck $d$ slides off from the lifter $C^1$, or $C^2$, or $C^3$, the coiled springs $i^1$ and $i^2$ will instantly force the piston D downward with great velocity, causing a concussion on the ore, or materials in the hopper $A^1$ and $A^2$, as well as on the sieves $B^1$ and $B^2$, while the air, having filled the space in the blast-cylinder, from the bottom to the piston D, is forced to pass through the valves $k^1$ and $k^2$, lifting up the materials on the segments of the sieves $B^1$ and $B^2$. The great velocity of the escaping air will in this moment allow only the larger particles of the separated materials to pass downward through the interstices $l\,l\,l$, &c., into the receiving-chamber $E^1$ and $E^2$. By the upward motion of the piston D, the air, having found its inlet through valve $m$, will be forced through the valves $n^1$ and $n^2$, under the sieves, in a similar manner as before, but with the difference that the same will act upon the materials with the regularity of the raising piston D, without the irregular pressure of the springs, and without concussion. In this way the smaller particles will only be agitated, and dust separated in a proper manner.

The separated particles of the metals, or the minerals, will fill up the receiving-chambers $E^1$ and $E^2$. As soon as this is the case, the raked pitmen $F^1$ and $F^2$ are to be adjusted by the screw $o$, on the crank G, to act on the wheel $p^1$ and $p^2$, fastened on the conveyer $H^1$ and $H^2$ in such a manner as to carry off just as much of the separated materials as there will be separated through the sieves into the receiving-chambers.

The conveyers $H^1$ and $H^2$ may be either corrugated in the line of their length, or in the form of an endless screw, to facilitate the delivery of the material conveyed thereupon.

In this way all material of a greater specific weight will find its separation through the receiving-chambers, while all waste, or lighter materials, will pass over the sieves into the hoppers $q^1$ and $q^2$. If the latter contain some other valuable materials besides the rocky or earthy matters, the same may be separated from the rock or earth by a subsequent treatment, as above explained.

It is evident that a different size of the grain of a substance to be separated, as well as the smaller or larger yield of valuable materials, in regard to quantity, requires different action of the machine, in order to answer in every case. For this purpose, the sieves are so constructed and arranged that the same may easily be changed from a horizontal position to any practical inclination, by the screws $r^1$ and $r^2$. Such an inclined position of the sieves will be necessary in the same degree as the waste or earthy matters are predominant to the valuable materials, in order to cause their more speedy passage over the sieves into the hoppers $q^1$ and $q^2$. It is further evident that the width of the interstices between the different segments of the sieves which permit the valuable materials to pass into the receiving-chambers, ought to be in proportion to the yield of the materials to be separated.

This can be done by means of the screws $s^1$ and $s^2$, on the lower frame of the sieves, to any desirable width. The air being forced for the purpose of separating the valuable materials to pass under the sieves $B^1$ and $B^2$, will escape partially through the wire gauze of the sieves, and partially through the interstices $l\,l\,l$, &c. The former being divided into small jets by the wire gauze, will promote the separation of the smaller particles of the valuable materials, while the stronger and less divided current of air through the interstices $l\,l\,l$, &c., will especially act on the larger particles. Therefore, in the case where the materials to be separated are of a very minute size, the segments of the sieves may be formed more or less in the shape of tubes, by properly regulating the screws $s^1$ and $s^2$ for this purpose, so that all the introduced air is forced to pass through the wire gauze, and cause even the most minute particles of valuable metals to accumulate in the receiving-chambers $E^1$ and $E^2$. In such a case, the interstices $l\,l\,l$, &c., will be widened, but the same may be properly decreased by the down-pressing of the frame $t^1$ and $t^2$ upon the segments of the sieves, causing the same to assume a less convex surface, so far as desirable.

Finally, the nature and minuteness of the materials to be separated will require a different quantity of air for their treatment. For this purpose the stroke of the piston D may properly be so arranged as to force only the requisite quantity of air through the sieves, by shortening or lengthening either the truck $d$, or adjusting the connection-cords $f^1$ and $f^2$ by the regulating-screws $g^1$ and $g^2$, in a proper manner.

Therefore, it may appear evident that, as set forth above, the machine is constructed to be easily regulated for any and every desirable case for practical use, to secure a general application of the same.

What I claim as my invention, and desire to secure by Letters Patent, is—

1. A machine for concentrating and separating metals and mineral substances from rocks, alluvials, and other substances, contained, in combination, in their natural state, or as mats, or other metallurgic products, when constructed and arranged in the manner and for the purpose herein described.

2. The construction and arrangement of the sieves $B^1$ and $B^2$, in a machine for concentrating and separating ores and metals, in the manner and for the purpose herein described.

3. The combination of the blast-chamber E with the valves $k^1$ $k^2$ $n^1$ $n^2$, guide-rods $j^1$ and $j^2$, and coil-spring $i^1$ and $i^2$, in the manner and for the purpose herein described.

4. The combination of the lifters $C^1$ $C^2$ $C^3$ with the truck $d$, on the shaft $e$, and piston D, in the manner and for the purpose herein described.

5. The pitman $F^1$ and $F^2$, with the adjustable screw $o$, crank G, wheels $p^1$ and $p^2$, and the conveyer $H^1$ and $H^2$, in the manner and for the purpose herein described.

6. The combination of the wheels $e^1$ $e^2$, cords $f^1$ $f^2$, and the set-screws $g^1$ and $g^2$, in the manner and for the purpose herein described.

In testimony whereof, I have signed my name to this specification, in the presence of two subscribing witnesses.

ROBERT GEORGE.

Witnesses:
WM. MARTIN,
WM. CAMMACK.